US008248024B2

(12) United States Patent
Yuan et al.

(10) Patent No.: US 8,248,024 B2
(45) Date of Patent: Aug. 21, 2012

(54) ADVANCED INDUCTIVE CHARGING PAD FOR PORTABLE DEVICES

(75) Inventors: Tong Yuan, Beijing (CN); Xiao Yang, Beijing (CN); Min Wang, Beijing (CN); Chunhui Zhang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 12/192,220

(22) Filed: Aug. 15, 2008

(65) Prior Publication Data

US 2010/0039066 A1 Feb. 18, 2010

(51) Int. Cl.
*H02J 7/00* (2006.01)
(52) U.S. Cl. ....................................................... 320/108
(58) Field of Classification Search .................... 320/108
See application file for complete search history.

(56) References Cited

U.S. PATENT DOCUMENTS

| | | | |
|---|---|---|---|
| 6,906,495 B2 | 6/2005 | Cheng et al. | |
| 7,271,569 B2 | 9/2007 | Oglesbee | |
| 7,375,493 B2 | 5/2008 | Calhoon et al. | |
| 2003/0197488 A1 * | 10/2003 | Hulvey | 320/135 |
| 2004/0189246 A1 | 9/2004 | Bulai et al. | |
| 2006/0017692 A1 * | 1/2006 | Wehrenberg et al. | 345/156 |
| 2006/0061323 A1 * | 3/2006 | Cheng et al. | 320/108 |
| 2006/0108977 A1 * | 5/2006 | Kagermeier et al. | 320/108 |
| 2007/0029965 A1 | 2/2007 | Hui | |
| 2007/0279002 A1 | 12/2007 | Partovi | |
| 2007/0287508 A1 | 12/2007 | Telefus | |
| 2008/0094027 A1 | 4/2008 | Cho | |
| 2008/0211458 A1 * | 9/2008 | Lawther et al. | 320/132 |

FOREIGN PATENT DOCUMENTS

WO WO 2005/109597 * 11/2005

OTHER PUBLICATIONS

Ghetto Wireless Mouse Inductive Charger Mod (that didnt friggin work) http://www.afrotechmods.com/fuxx0red/mouse/mouse.htm. Last accessed May 28, 2008, 4 pages.
Recharge any device, without plugging into any cable!, posted Mar. 22, 2003. http://www.geekzone.co.nz/content.asp?contentid=591. Last accessed May 28, 2008, 2 pages.
Fulton Innovation's Intelligent Wireless Power http://www.ecoupled.com/pdf/eCoupled_CPU.pdf. Last accessed May 28, 2008, 4 pages.

* cited by examiner

*Primary Examiner* — Melissa Koval
*Assistant Examiner* — Daniel Miller

(57) ABSTRACT

Systems and methodologies for efficient inductive charging of electronic devices are provided herein. A charging device as described herein can utilize a sensor-integrated resonating circuit with automatic frequency control to provide low-cost inductive charging functionality for electronic devices. As further described herein, a device to be charged can be equipped with a power receiver operable to receive power from the charging device via electromagnetic induction. The power receiver can additionally be utilized for initiation of charging such that charging for a device commences upon its associated power receiver being brought within range of an inductive charging surface at the charging device. Further, a charging device as described herein can have an inductive charging surface as well as a non-charging surface for providing other services such as information display. A charging device can integrate with an external information source to obtain items to be displayed at a non-charging surface thereon.

18 Claims, 11 Drawing Sheets

ADVANCED INDUCTIVE CHARGING PAD FOR PORTABLE DEVICES

BACKGROUND

Due to high customer demand for portable devices and other similar electronic devices and continuous innovation in the field of mobile technology, the marketplace for portable devices is rapidly enlarging. However, techniques for charging portable devices have seen little innovation. While techniques for wirelessly charging an electronic device through electromagnetic induction and/or other means have been proposed, these previous techniques have encountered a number of shortcomings, and as a result wired charging remains the dominant charging technique for portable devices. For example, wireless charging techniques typically provide low efficiency and slow charging speeds as compared to comparable wired charging solutions. Further, wireless charging systems are often prohibitively costly to manufacture and require a form factor that is too large to fit inside a portable device. In addition, consumer concern with respect to electromagnetic radiation emitted by existing wireless charging devices has chilled the rate of adoption of such devices as a primary charging solution.

Accordingly, there is a need for wireless charging systems and/or techniques for portable devices that mitigate at least the above shortcomings.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies are provided herein that facilitate improved inductive charging for portable devices. In accordance with one aspect, a charging device is described herein that utilizes a sensor-integrated resonating circuit with automatic frequency control to provide low-cost inductive charging functionality for electronic devices. By employing various techniques described herein, charging speed and efficiency of the inductive charging device is comparable to that of conventional wired charging. Additionally, electromagnetic radiation emitted by the charging device can be restricted to a substantially small area without affecting charging performance.

In accordance with one aspect, a charging device as described herein can have at least one inductive charging surface and at least one non-charging surface. Orientation of the charging device can detected, and charging can be initialized at the charging device if the device is oriented to allow engagement between a portable device and a charging surface. In one example, a portable device to be charged can be equipped with a power receiver such that a charging device can detect the presence of a device to be charged in order to provide power thereto. Upon a power receiver being placed in range of the inductive charging surface, a switching mechanism at the charging device can be driven to provide a varying current across the charging surface, thereby creating a magnetic field between the charging surface and the power receiver. From the created magnetic field, a circuit associated with the power receiver at the electronic device can receive power from the charging device.

In accordance with another aspect, a charging device as described herein can generally be constructed in the form of a charging pad having an inductive charging surface and a non-inductive display surface. The charging surface can be configured to enable charging of one or more similar or disparate electronic devices engaged therewith. Further, when visible, the display surface can provide a display for text, graphics, and/or other suitable items. In one example, the display surface can integrate with a computer or other device to display information provided by the integrated device.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
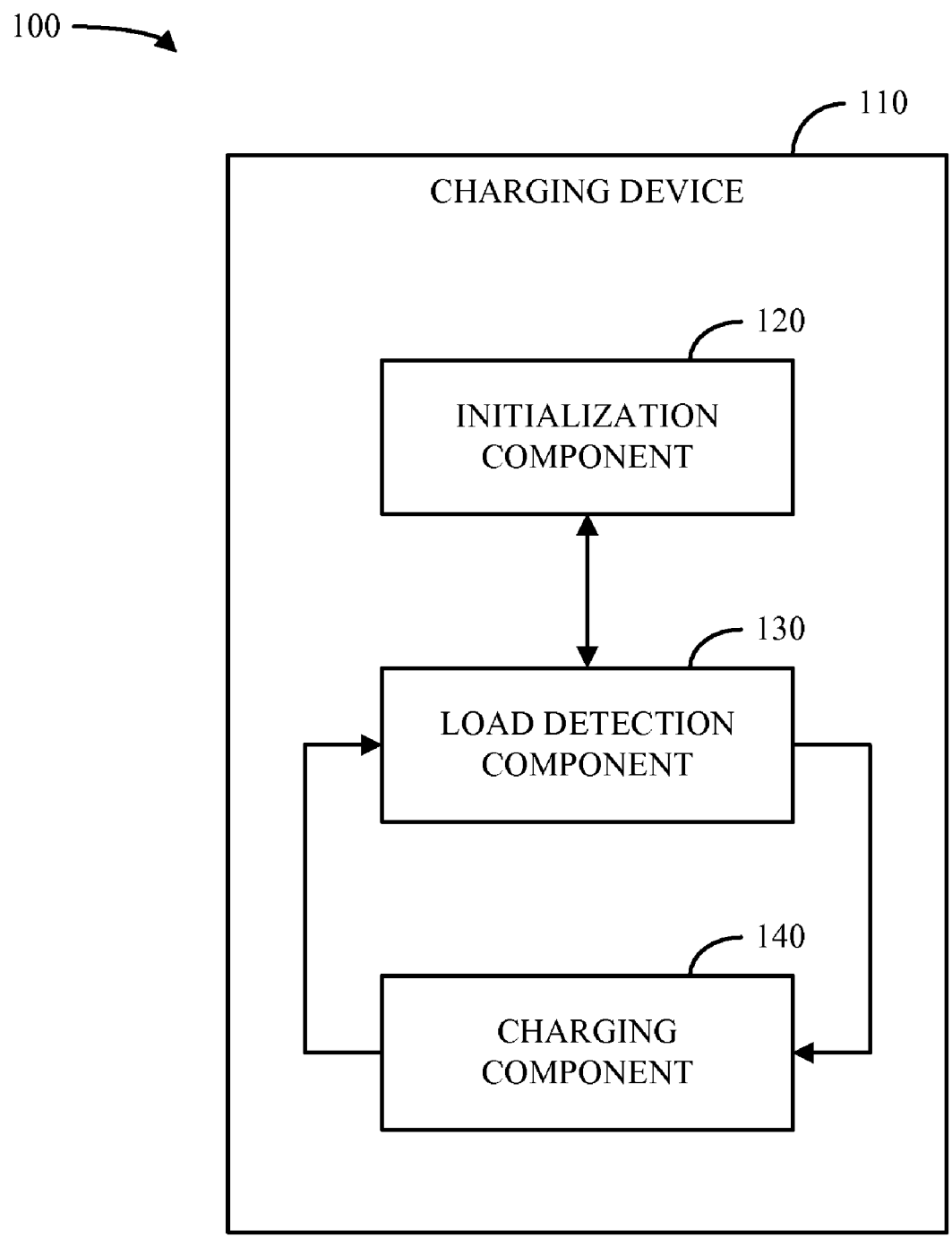
FIG. 1 is a high-level block diagram of a system for charging an electronic device in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," "interface," "schema," "algorithm," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawings, FIG. 1 illustrates a system 100 for charging an electronic device in accordance with various aspects. In accordance with one aspect, system 100 can include a charging device 110, which can utilize electromagnetic induction and/or other suitable techniques for wirelessly providing power to one or more electronic devices. In one example, the charging device 110 can have one or more designated charging surfaces that are equipped for providing power to electronic devices engaged thereto. These charging surfaces can, for example, utilize a series of wires or coils through which a current can be passed to generate a magnetic field. The magnetic field can be controlled to extend a predetermined inductive range from the charging surface, thereby allowing one or more electronic devices to leverage the magnetic field to obtain power from the charging surface.

In accordance with another aspect, the charging device 110 can include an initialization component 120, a load detection component 130, and/or a charging component 140 to facilitate wireless charging of one or more electronic devices in a manner that mitigates the shortcomings associated with existing wireless charging solutions. For example, existing wireless charging techniques are generally capable of only low-efficiency operation, resulting in slow charging speeds and higher operating costs. In addition, existing wireless charging systems are often prohibitively costly to manufacture and require a form factor that is too large to be utilized for portable devices. Further, existing wireless charging systems often emit a high amount of electromagnetic radiation, which can potentially be harmful to some electronic devices. To mitigate these shortcomings, the charging device 110 can utilize a sensor-integrated resonating circuit with automatic frequency control and/or other mechanisms that provide low-cost inductive charging functionality. In one example, by utilizing such mechanisms, the speed and efficiency of the charging device 110 can be comparable to that of conventional wired charging. Additionally, the charging device 110 can provide inductive charging functionality by emitting electromagnetic radiation over a substantially small range without affecting charging performance.

In accordance with various aspects, an initialization component 120 at the charging device 110 can enable charging operation by the charging device 110 if one or more predetermined conditions are met. For example, the initialization component 120 can enable charging upon a determination that a charging surface located on the charging device 110 is engageable by one or more to-be-charged electronic devices. This determination can be made by, for example, monitoring the orientation of the charging device 110 to determine whether a charging surface is facing up and/or is otherwise engageable by one or more to-be-charged devices.

Upon charging being enabled at the charging device 110, a load detection component 130 can then be utilized to detect engagement between one or more to-be-charged devices and the charging surface. In one example, the load detection component 130 can monitor for device engagement by attempting to discover one or more electronic devices being brought within an inductive range of the charging device 110. In accordance with one aspect, charging can be disabled at the charging device 110 pending engagement with a charging surface of the charging device 110 to conserve power.

Once a device has been detected by the load detection component 120, a charging component 130 associated with the charging device 110 can be utilized to provide power to the engaged device via electromagnetic induction and/or another suitable wireless charging technique. In one example, the charging component 140 can obtain information relating to a to-be-charged device from the load detection component 130 and utilize this information to increase power transfer efficiency between the charging device 110 and the to-be-charged device. Additionally and/or alternatively, the load detection component 130 can detect removal of an electronic device from engagement with the charging device 110, at which time the charging component 140 can cease operation to conserve power.

Figure 2:
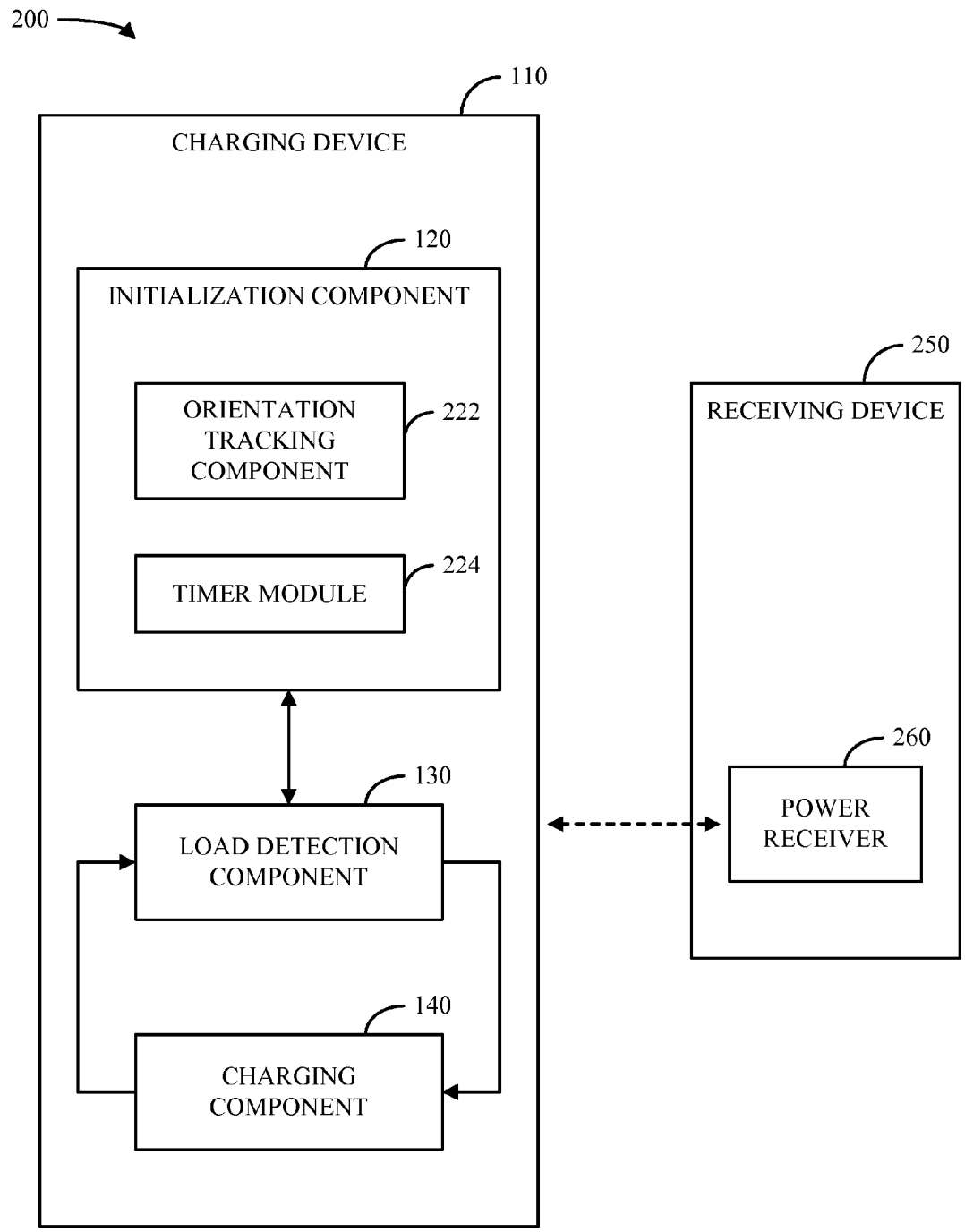
FIG. 2 is a block diagram of a system that facilitates inductive charging in accordance with various aspects.

Referring now to FIG. 2, a system 200 that facilitates inductive charging of an electronic device 250 is illustrated. As illustrated, system 200 includes a charging device 110, which can include one or more charging surfaces and utilize an initialization component 120, a load detection component 130, and/or a charging component 140 to charge one or more receiving devices 250 in a similar manner to that described above with respect to system 100.

In accordance with one aspect, the charging device 110 can operate as follows to provide power to a receiving device 250. The charging device 110 can begin operation in an idle mode, wherein charging is disabled and no current flows through the charging surface of the charging device 110 to conserve power. As noted above with regard to system 100, an initialization component 120 at the charging device 110 can determine whether one or more predetermined conditions are met and can enable charging at the charging device 110 upon satisfaction of those conditions. For example, the initialization component 120 can utilize an orientation tracking component 222 to determine the orientation of the charging device 110. The orientation tracking component 222 can be and/or incorporate the functionality of an accelerometer (e.g., a linear accelerometer and/or a gyrometer), an optical tracking system, and/or any other suitable means for monitoring device orientation. In one example, the orientation tracking component 222 can determine whether a charging surface at the charging device 110 is facing up and/or is otherwise oriented to allow engagement between the charging surface and one or more receiving devices 250. If it is determined that the charging device 110 is so oriented, the initialization component 120 can enable charging at the charging device 110.

In accordance with another aspect, once the initialization component 120 enables charging at the charging device 110, the charging device 110 can enter a load detection mode, wherein it is determined whether engagement has occurred between a receiving device 250 and the charging device 110. In one example, a receiving device 250 to be charged by the charging device 110 can be equipped with a power receiver 260, which can comprise an inductor and/or other components operable to obtain power from the charging device 110 via electromagnetic emissions from the charging device 110.

In accordance with one aspect, once the charging device 110 has entered the load detection mode, a load detection component 130 at the charging device 110 can determine whether a power receiver 260 associated with a receiving device 250 has been brought within the inductive range of the charging device 110. In one example, the load detection component 130 can operate in conjunction with a timer module 224 at the initialization component 120 to determine an amount of elapsed time between entry into the load detection mode and detection of a power receiver 260. If a power receiver 260 is not detected by the load detection component 130 within a predetermined period of time following entry into the load detection mode, the initialization component 120 can cause the charging device 110 to re-enter the idle mode and disable charging, thereby reducing the overall power consumption of the charging device 110.

Upon a power receiver 260 associated with a receiving device 250 being brought within the inductive range of the charging device 110, the charging device 110 can enter a charging mode to provide power to the receiving device 250 via the power receiver 260. In one example, a charging component 140 at the charging device 110 can comprise an inductor coil and/or other means for generating a magnetic field over the inductive range of the charging device 110 in response to an electrical current. The charging component 140 can receive data from the load detection component 130 corresponding to the resonating frequency of a power receiver 260 engaged with the charging device 110, and based on this information a periodic electrical signal can be generated and/or otherwise utilized by the charging component 140 based on the resonating frequency of the power receiver 260 to facilitate optimized inductive charging of the receiving device 250.

In accordance with one aspect, the load detection component 130 can be operable to determine when a receiving device 250 has been removed from the inductive range of the charging device 110. Upon detecting that a receiving device 250 has been so removed, the charging device 110 can re-enter the idle mode and charging can be disabled to reduce power consumption.

Figure 3:
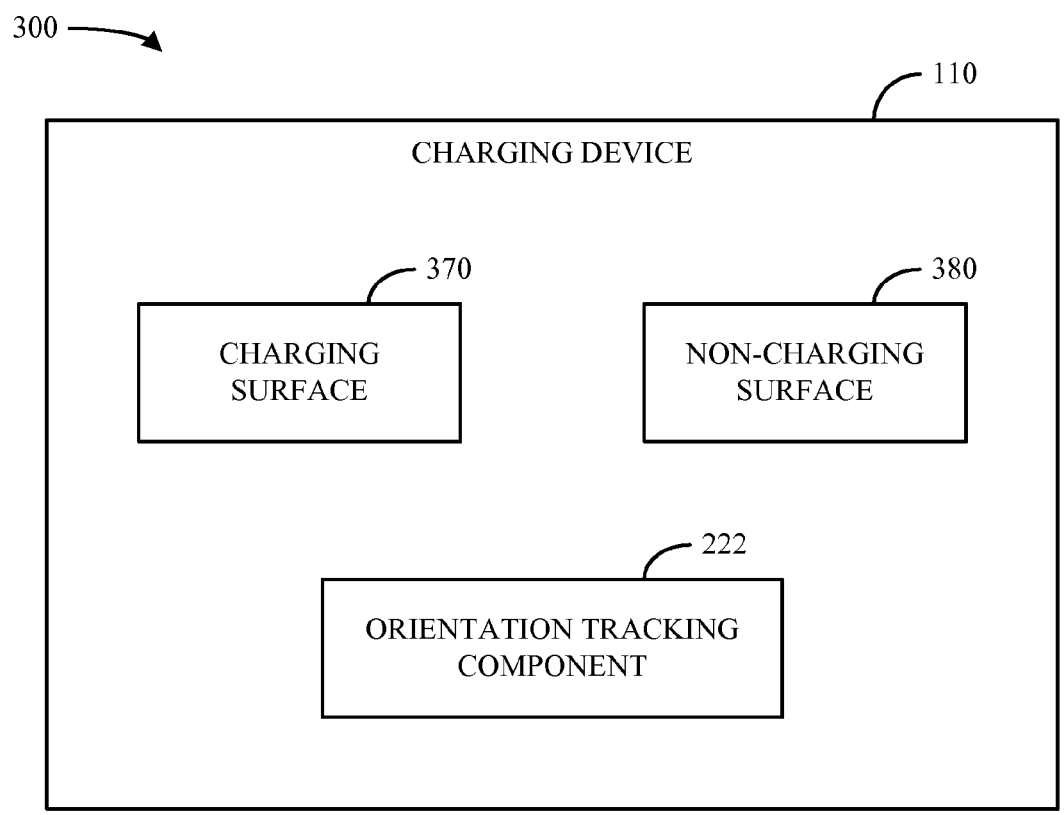
FIG. 3 is a block diagram of a multifunctional charging system for electronic devices in accordance with various aspects.

Turning to FIG. 3, a multifunctional charging system 300 for electronic devices in accordance with various aspects is illustrated. In one example, system 300 includes a charging device 110, which can provide inductive charging functionality for one or more electronic devices as generally described above with respect to systems 100 and/or 200. As FIG. 3 illustrates, the charging device 110 can include one or more charging surfaces 370 that can be engageable by one or more electronic devices to wirelessly obtain power via electromagnetic induction as generally described herein In accordance with one aspect, the charging device 110 can additionally include one or more non-charging surfaces 380, which can provide non-charging services for a user of the charging device 110. For example, a non-charging surface can include a display screen for video output, a speaker for audio output, and/or other similar features. In one example, an orientation tracking component 222 associated with the charging device 110 can determine whether a charging surface 370 and/or a non-charging surface 380 at the charging device 110 are oriented to render the surface(s) 370 and/or 380 usable for their intended purpose(s). If the orientation tracking component 222 determines that a surface 370 and/or 380 is oriented to allow its functionality to be realized, the orientation tracking component 222 can facilitate use of the surface 370 and/or 380 for its provided service(s). Otherwise, the orientation tracking component 222 can disable the functionality of the surface 370 and/or 380 to reduce the amount of power consumed by the charging device 110. Examples of services that can be performed by a non-charging surface 380 are provided in more detail infra.

Figure 4:
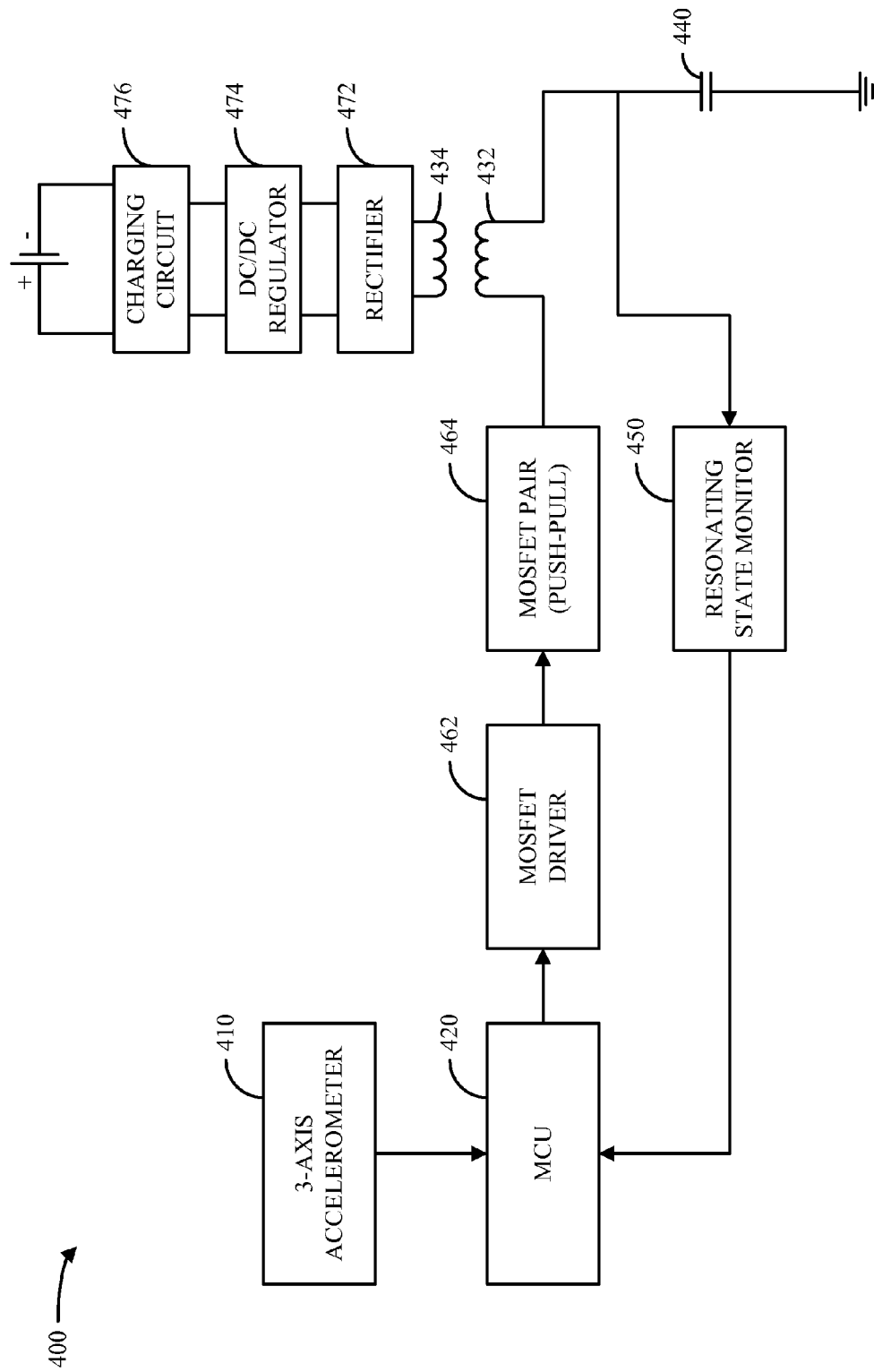
FIG. 4 illustrates an example inductive charging system in accordance with various aspects.

Referring to FIG. 4, an example inductive charging system 400 is illustrated in accordance with various aspects. System 400 can be used, for example, in connection with a charging pad (e.g., charging device 110) for providing power to an electronic device (e.g., receiving device 250). In accordance with one aspect, system 400 can operate in three working modes—an idle mode, a load detecting mode, and a charging mode—in a similar manner to that described above with respect to system 200.

In one example, a three-axis accelerometer 410 and/or a similar orientation tracking device can monitor a charging pad associated with system 400 to determine whether a charging surface of the pad is facing up to sufficiently allow electronic devices to be placed thereon. While a single three-axis accelerometer 410 is illustrated in system 400, it should be appreciated that an accelerometer that measures linear and/or angular acceleration along any number of axes could additionally and/or alternatively be used. In another example, the accelerometer 410 can provide data regarding the orientation of the charging pad to a microcontroller (MCU) 420. If it is determined that the charging surface of the charging pad does not face up, the MCU 420 can shut down a metal-oxide-semiconductor field-effect transistor (MOSFET) driver 462, thereby powering off the charging system and placing the system 400 into idle mode.

Alternatively, upon a determination that the charging surface of the charging pad is facing up, the system 400 can enter load detection mode. In accordance with one aspect, a resonating state monitor 450 can be utilized to detect the presence of a power receiver coil 472 within the inductive range of an inductor 432 provided at the charging surface of the charging pad. In one example, the resonating state monitor 450 can detect the presence of a power receiver coil 472 by detecting resonance at the charging inductor 432 and an associated capacitor 440. This can be accomplished by, for example, measuring voltage across the capacitor 440. For example, the system 400 can be configured such that the charging inductor 432 and capacitor 440 do not resonate when a power receiver coil 434 is not present. Thus, when a power receiver coil 434 is not present, the state of the charging system can remain substantially constant, which in turn can cause the voltage across the capacitor 440 to be high due to the high steady state impedance of a capacitor. As a result, the resonating state monitor 450 can measure the voltage across capacitor 440 and, if the measured voltage is above a predetermined threshold, can infer that no power receiver coil 434 is present. In one example, the resonating state monitor 450 can provide voltage data to the MCU 420 to enable the MCU 420 to facilitate a determination as to whether a power receiver coil 434 is present.

In accordance with another aspect, the resonating state monitor 450 can monitor for the presence of a power receiver coil 434 for a predetermined time (e.g., 20 seconds) following entry into load detection mode. If no power receiver coil 434 is detected within the predetermined time period, the system 400 can re-enter idle mode to conserve power.

In one example, the charging system can be configured to resonate if a power receiver coil 434 is present within the inductive range of a charging surface at the charging pad. It can be appreciated that the resonation of the charging system can cause the impedance of the capacitor 440, and in turn the voltage across capacitor 440, to drop. As a result, the resonating state monitor 450 can determine that a power receiver coil 434 has been brought within range of the charging system by detecting a voltage drop across the capacitor 440.

In another example, by detecting a voltage across capacitor 440, the resonating state monitor 450 can determine the mutual inductance of the charging inductor 432 and the power receiver coil 434, based on which a resonant frequency of the system 400 can be calculated. Further, the resonating state monitor 400 can provide voltage readings obtained from the capacitor 440 to the MCU 420 in order to facilitate calculation of the resonant frequency of the system 400 at the MCU 420. In one example, the resonating state monitor 450 can include an analog to digital converter (ADC) to provide voltage readings in digital form to the MCU 420.

In accordance with another aspect, if a power receiver coil 434 is found to be placed on the charging pad or otherwise within the inductive range of the charging surface of the charging pad, the MCU 420 can cause the system 400 to enter a charging mode. In the charging mode, the MCU 420 can control a MOSFET driver 462, which in turn can drive a MOSFET push-pull switching circuit 464 to facilitate the generation of a periodically-varying inductive current through the charging inductor 432. In one example, the variance in the current across the charging inductor 432 can cause a magnetic field to be emitted by the charging pad, which can in turn induce an electrical current at a power receiver coil 434 located within the magnetic field. A rectifier 472 coupled to the power receiver coil 434 can then be utilized to convert the periodically-varying inductor current to a direct current (DC) signal. A DC/DC regulator 474 can further be utilized to process the DC signal from the rectifier 472, and a charging circuit 476 can utilize the regulated DC signal to charge a battery and/or another appropriate electrical storage means at an associated electronic device. In one example, the charging circuit 746 can cease providing power to its associated electronic device once the device becomes fully charged in order to prevent damage to the device due to overcharging.

In one example, readings from the resonating state monitor 450 can be utilized by the MCU 420 to optimize the frequency at which the MOSFET driver 462 drives the MOSFET switching circuit 464, thereby increasing the charging efficiency of the system 400 in terms of charging speed and/or power consumption. Additionally and/or alternatively, the resonating state monitor can monitor the power receiver coil 434 during charging to determine whether the coil has been removed from the inductive range of the charging pad. Upon determining that the power receiver coil 434 has been removed, the system 400 can re-enter idle mode and the charging system can be powered down.

Figure 5:
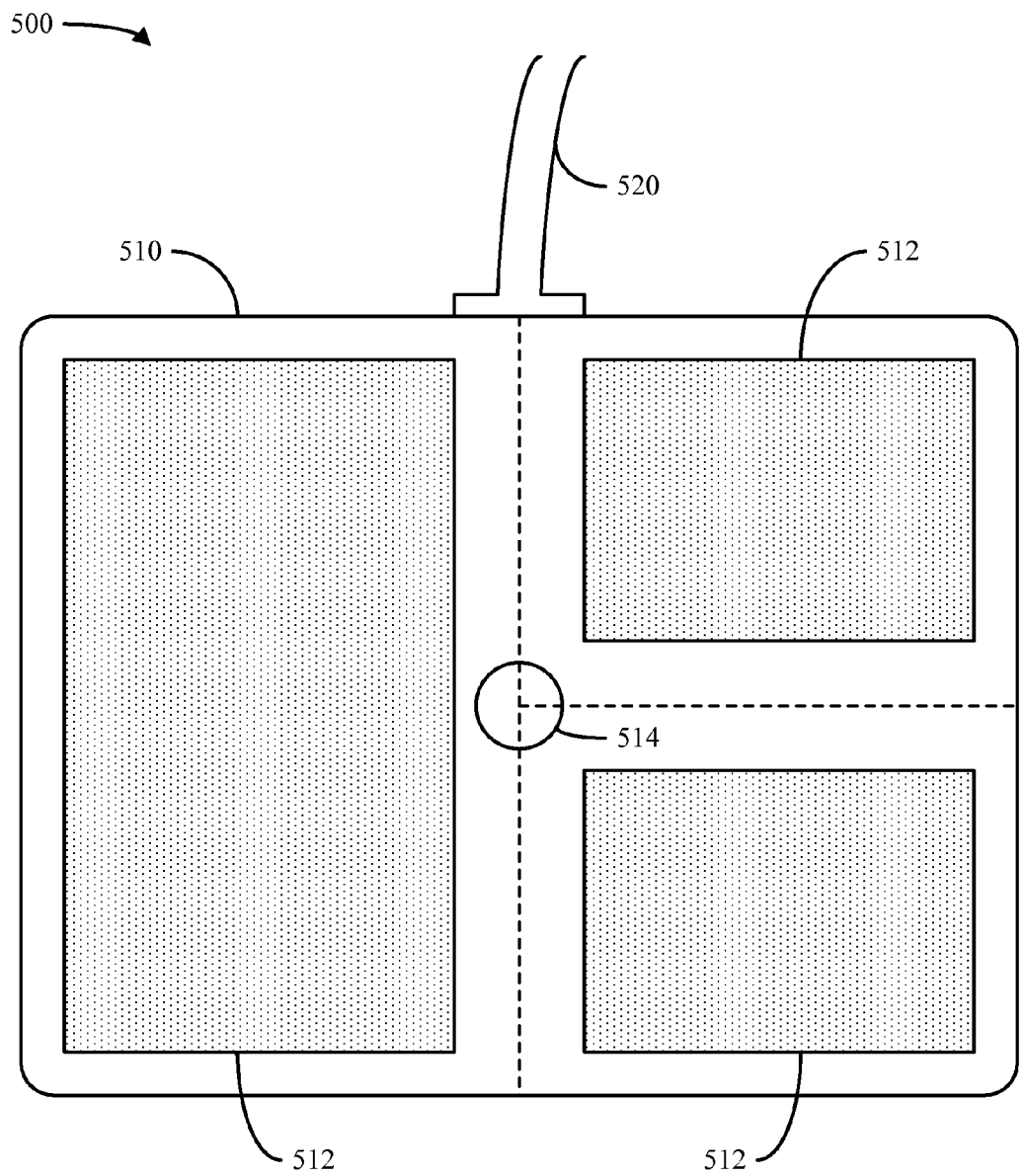
FIGS. 5-7 are illustrations of example charging devices in accordance with various aspects.
Figure 6:
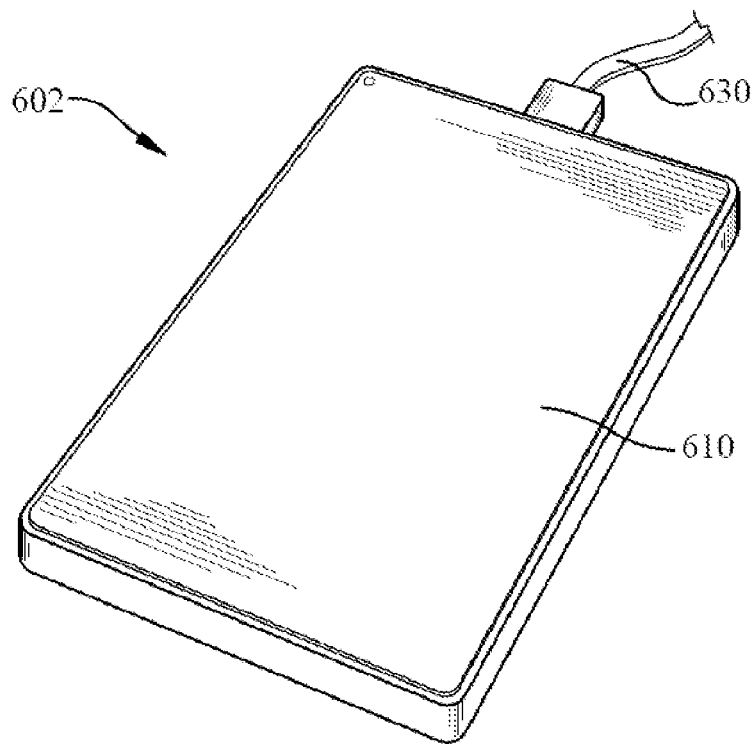
Figure 6:
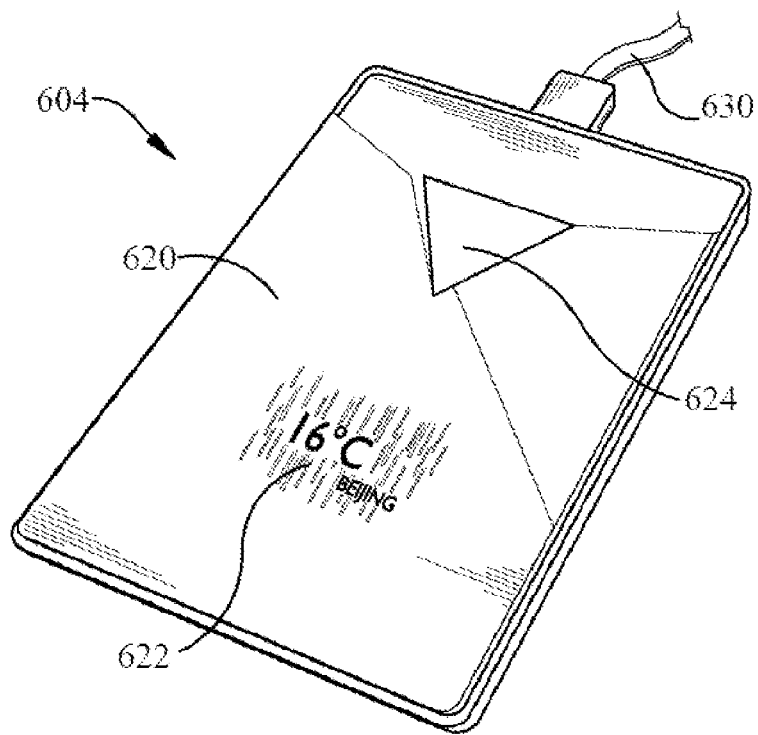
Figure 7:
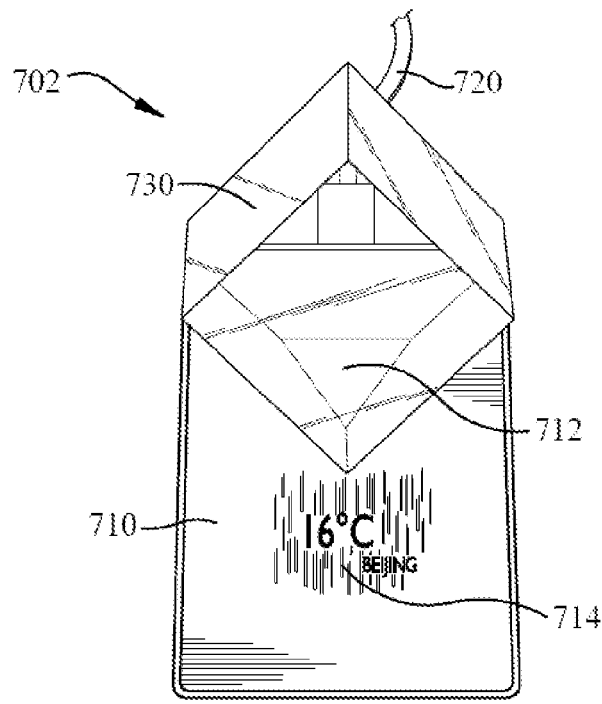
Figure 7:
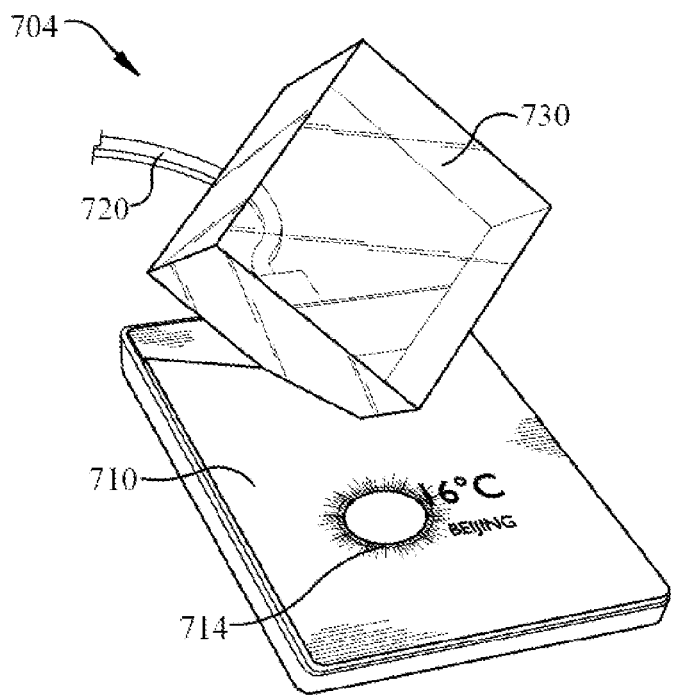

Turning now to FIGS. 5-7, diagrams are provided to illustrate various example implementations of the claimed subject matter. For the avoidance of doubt, the claimed subject matter is not intended to be limited by such examples. In addition, the examples illustrated herein are not meant to be construed as preferred or advantageous over other aspects or designs, nor are they meant to preclude equivalent structures and techniques known to those of ordinary skill in the art. Furthermore, it is to be appreciated that the various drawings are not drawn to scale from one figure to another nor inside a given figure, and in particular that the size of the components are arbitrarily drawn for facilitating the reading of the drawings.

FIG. 5 illustrates an example charging system 500 that can be implemented in accordance with various aspects. As FIG. 5 illustrates, the charging system 500 can include a charging pad 510. In accordance with one aspect, the charging pad 510 can serve as a wireless charging surface that is operable to recharge the batteries of respective devices placed thereon.

In one example, the charging pad 510 can be connected to a power source via a power cable 520 and/or any other suitable means. By connecting to a power source, the charging pad 510 can obtain power that can be transferred to one or more electronic devices during charging. It can be appreciated that the power cable 520 can connect the charging pad 510 to any suitable power source, such as a personal computer, a wall outlet, and/or any other source. Further, it should be appreciated that the power cable 520 can utilize any suitable connection format, such as a standard electrical connection, a Universal Serial Bus (USB) connection, and/or another connection format.

In accordance with one aspect, the charging pad 510 can facilitate charging of a plurality of disparate electronic devices, such as computer mice, game controllers, smartphones, digital media players, wireless headsets, etc., in a simultaneous manner. In one example, the charging pad 510 can be divided into a plurality of sections 512 to facilitate use of the pad 510 for multiple devices. It should be appreciated, however, that division of the charging pad 510 into sections 512 is not necessary and that, in some examples, electronic devices can be placed on any suitable portion of the charging pad 510 to obtain power therefrom.

In one example, pictures, names, and/or other indicators of devices that can be charged on the charging pad 510 can be provided on the charging pad 510 and/or its individual sections 512 to aid a user of the charging pad 510. Further, the charging pad 510 can include a light 514 and/or another appropriate mechanism for providing an indication that charging is occurring for one or more devices. It should be appreciated, however, that while a light 514 is illustrated in FIG. 5, the charging pad 510 can be capable of providing an indication of any suitable format, such as visual, auditory, or the like.

Referring to FIG. 6, respective illustrations 602 and 604 of another example charging device are provided in accordance with various aspects. In accordance with one aspect, the charging device illustrated by FIG. 6 employs a dual-sided design with a small form factor. The device can have a charging surface 610, as illustrated by diagram 602, which can be utilized for charging small form-factor electronic devices such as wireless computer mice, mobile telephones, and the like. As generally described above, an electronic device can be placed on top of the charging surface 610 for charging. In one example, power to be transferred to an electronic device during charging can be provided via a connection cable 630, which can connect the charging device to a power source as generally described above.

Additionally and/or alternatively, the charging device illustrated by FIG. 6 can have a display surface 620, as illustrated by diagram 604, which can facilitate the display of personalized information for a user of the charging device. In one example, the display surface 620 can include a display area 622, which can be an organic light-emitting diode (OLED) screen and/or other suitable display mechanism. In another example, the display area 622 can be utilized to display various information and/or graphics, such as weather conditions, sports scores, news headlines, and/or other selected items, to a user of the charging device illustrated by FIG. 6. In accordance with one aspect, information to be displayed at the display area 620 can be provided to the charging device illustrated by FIG. 6 in a variety of manners. For example, the charging device can utilize the connection cable 630 and/or a wireless receiver to interface with a computing device and/or another suitable external information store to obtain information to be displayed at the display area 622. Additionally and/or alternatively, items for display at the display area 622 can be generated by the charging device and/or provided to the charging device via a storage medium such as a memory card, floppy disk, or the like. In one example, the display surface 620 can additionally include a light panel 624 that provides ambient light for the display surface 620 and/or its surrounding area. In one example, the color and/or intensity of light provided by the light panel 624 can vary based on the content displayed at the display area 622. While the light panel 624 is illustrated in FIG. 6 as triangular in shape, it should be appreciated that the light panel 624 can be any suitable shape.

In one example, the charging device illustrated by FIG. 6 can utilize an accelerometer and/or another suitable orientation tracking mechanism to determine which surface 610 or 620 of the charging device is facing upward at a given time. Upon determining that a particular surface 610 or 620 faces upward, the charging device can facilitate use of the upward-facing surface while disabling the downward-facing surface.

With respect to FIG. 7, additional illustrations 702 and 704 of an additional example charging device that can be implemented in accordance with various aspects is illustrated. As diagram 702 illustrates, a charging device can include a display surface 710, which can incorporate the functionality of a light panel 712 and a display area 714 in a similar manner to the charging device illustrated by FIG. 6. In addition, the charging device illustrated by FIG. 7 can utilize a connection cable 720 for connecting to one or more power and/or data sources as further described above with regard to FIG. 6. In accordance with one aspect, the charging device illustrated by FIG. 7 can additionally include an optical object 730, which can be placed on the light panel 712 to provide an immersive environment to augment the presentation of information at the display area 714. The optical object 730 can be a lens, prism, and/or any other suitable object type. Further, the optical object 730 can be constructed in any suitable shape. Diagram 704 illustrates the display surface 710, connection cable 720, and optical object 730 at a second angle.

Figure 8:
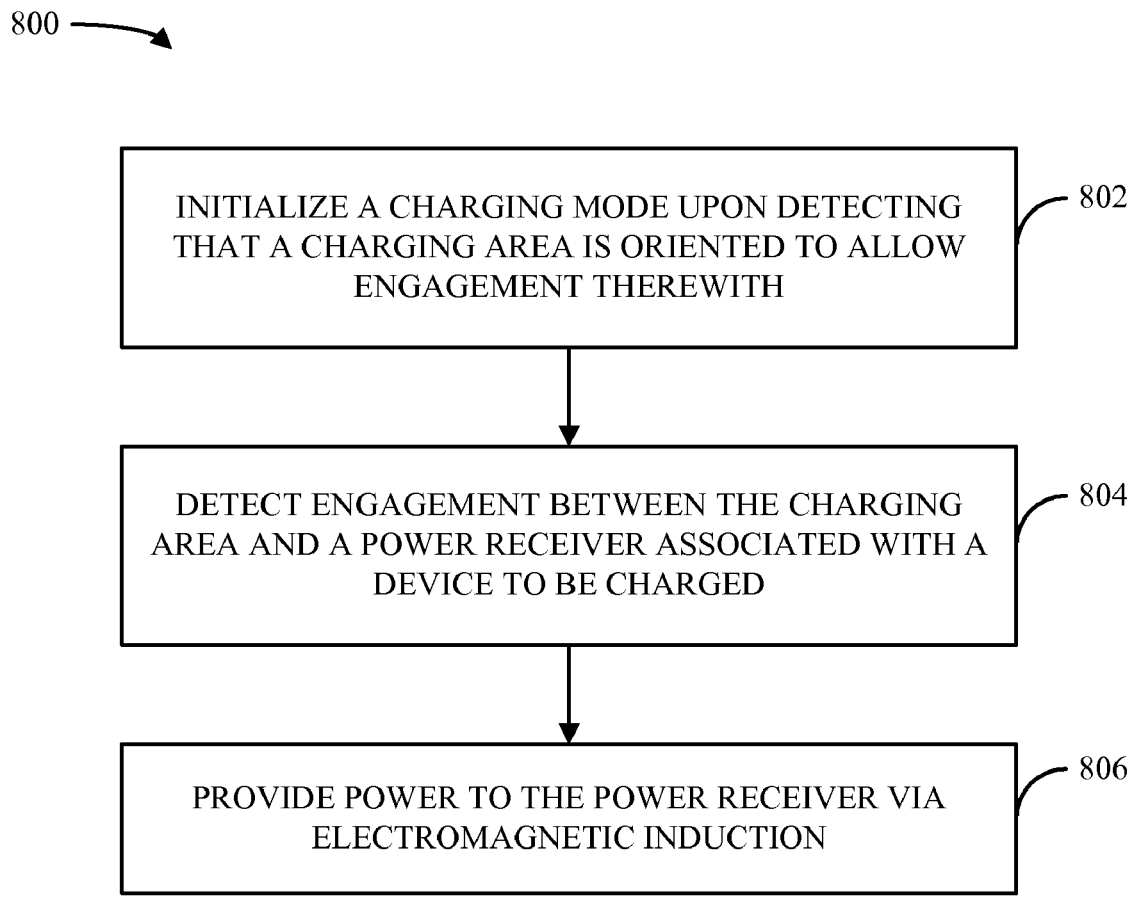
FIGS. 8-9 are flowcharts of respective methods for charging a portable device.
Figure 9:
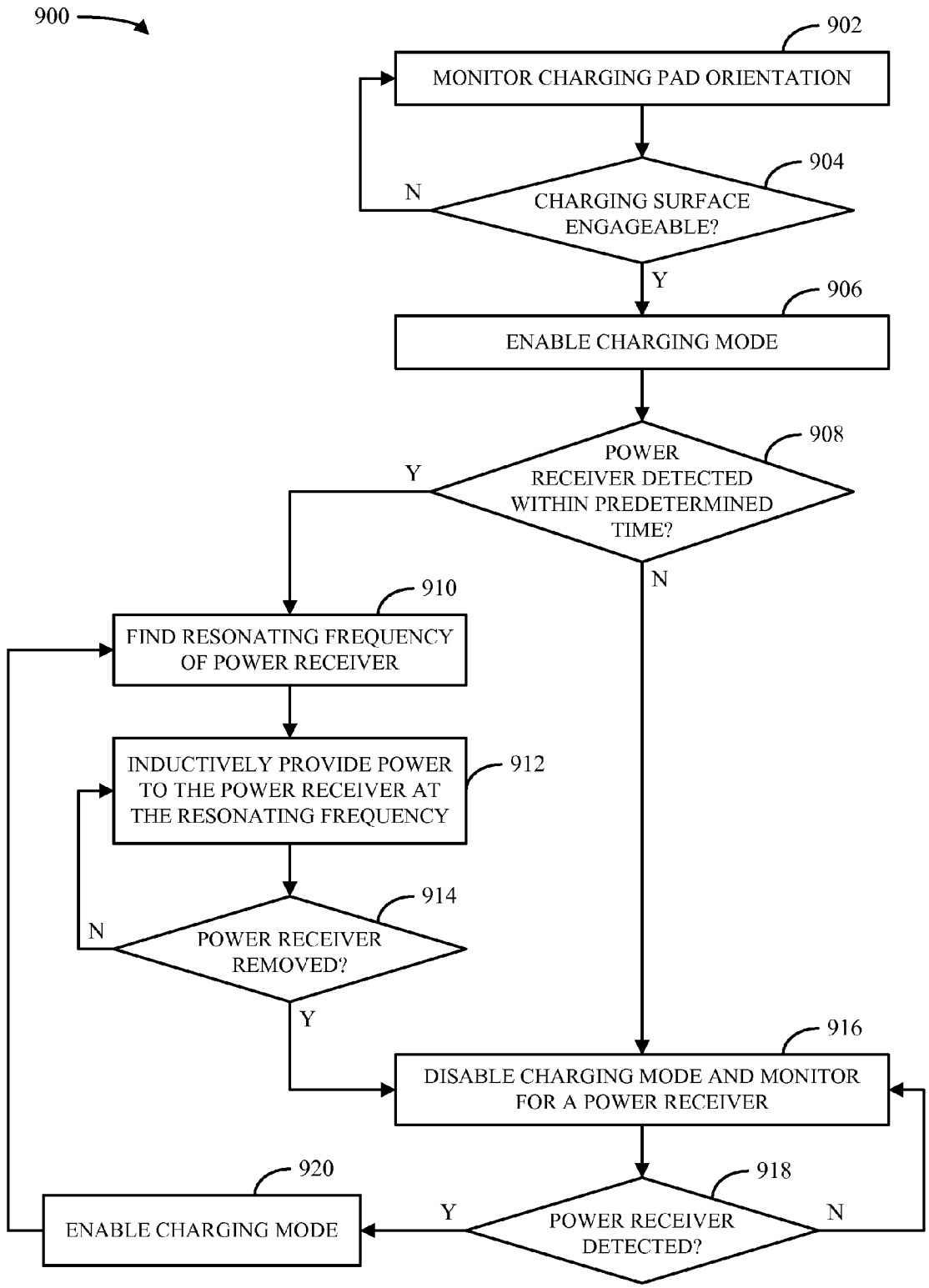
Figure 10:
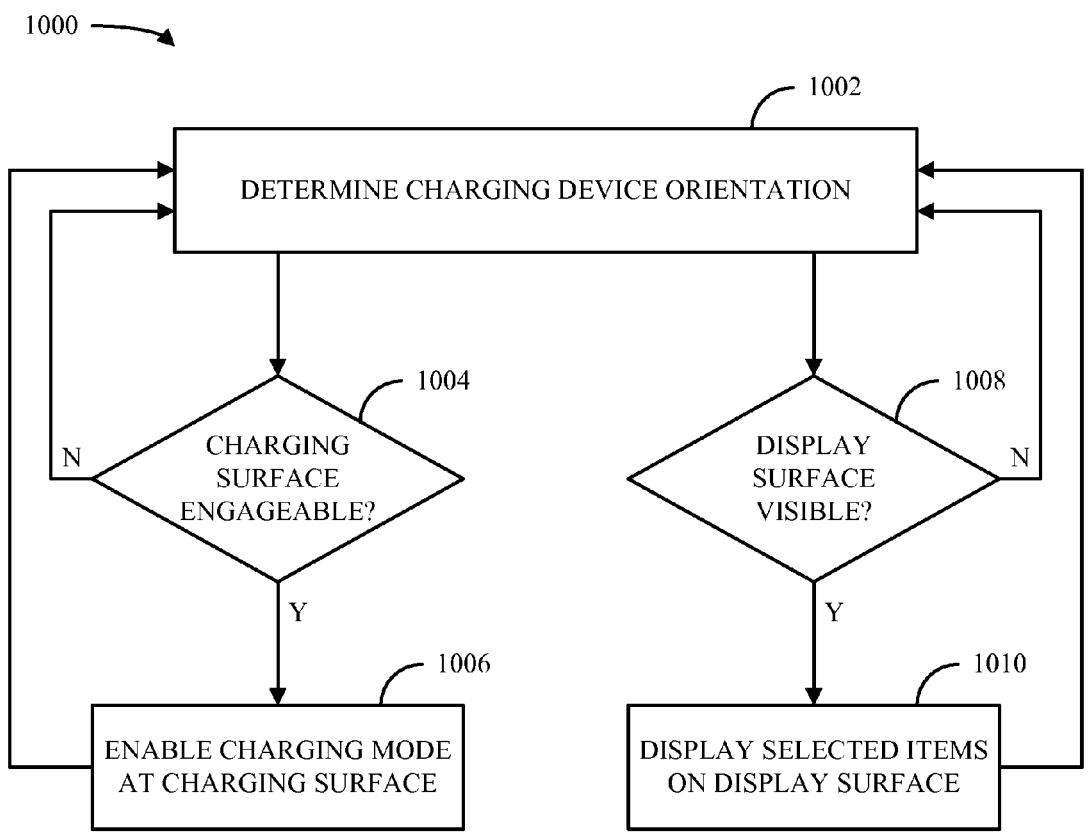
FIG. 10 is a flowchart of a method for controlling a multi-purpose charging device.

Turning to FIGS. 8-10, methodologies that may be implemented in accordance with various features presented herein are illustrated via respective series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Turning to FIG. 8, a method 800 of charging a portable device (e.g., a receiving device 250) is illustrated. At 802, a charging mode (e.g., at a charging device 110) is initialized (e.g., by an initialization component 120) upon detecting that a charging area is oriented to allow engagement therewith. At 804, engagement between the charging area and a power receiver associated with a device to be charged is detected (e.g., by a load detection component 130). At 806, power is provided to the power receiver detected at 804 (e.g., using a charging component 140) via electromagnetic induction.

FIG. 9 illustrates another method 900 for charging a portable device. At 902, the orientation of a charging pad is monitored (e.g., by an orientation tracking component 222). At 904, it is determined whether the charging pad is oriented such that a charging surface of the charging pad is engageable. If the charging pad is not oriented such that a charging surface is engageable, method 900 returns to 902 and monitoring of the orientation of the charging pad continues. Otherwise, method 900 proceeds to 906, wherein a charging mode is enabled.

Next, at 908, it is determined whether a power receiver (e.g., a power receiver 260) is detected at the charging pad within a predetermined period of time following entry into the charging mode at 906 (e.g., as measured by a timer module 224). If a power receiver is detected, method 900 proceeds to 910, where a resonating frequency of the power receiver is found. Next, at 912, power is inductively provided to the power receiver at the resonating frequency determined at 910. At 914, it is then determined whether the power receiver has been removed from the charging pad. If the power receiver has not been removed, method 900 returns to 912 to continue providing power to the power receiver.

Upon determining at 908 that a power receiver has not been detected, or upon determining at 914 that a power receiver has been removed, method 900 can proceed to 916, wherein the charging mode enabled at 906 is disabled and monitoring continues for a power receiver. At 918, it is then determined whether a power receiver has been detected. If a power receiver is not detected, method 900 returns to 916 to continue monitoring. Alternatively, if a power receiver is detected, method 900 proceeds to 920 to re-enable charging mode and subsequently to 910 to find a resonating frequency of the detected power receiver.

Referring now to FIG. 10, a method 1000 for controlling a multi-purpose charging device is illustrated. At 1002, the orientation of the charging device is determined. At 1004, it is determined whether a charging surface (e.g., charging surface 370) of the charging device is engageable. If the charging surface is engageable, method 1000 continues to 1006, wherein a charging mode is enabled at the charging surface. Upon a negative determination at 1004, or after enabling the charging mode at 1006, method 1000 returns to 1002.

At the same time that 1004 is performed and/or at a different time, method 1000 can proceed from 1002 to 1008, wherein it is determined whether a display surface (e.g., a non-charging surface 380) at the charging device is visible. If so, method 1000 can proceed to 1010, wherein selected items are displayed on the display surface. Upon a negative determination at 1008, or following the display at 1010, method 1000 can return to 1002.

Figure 11:
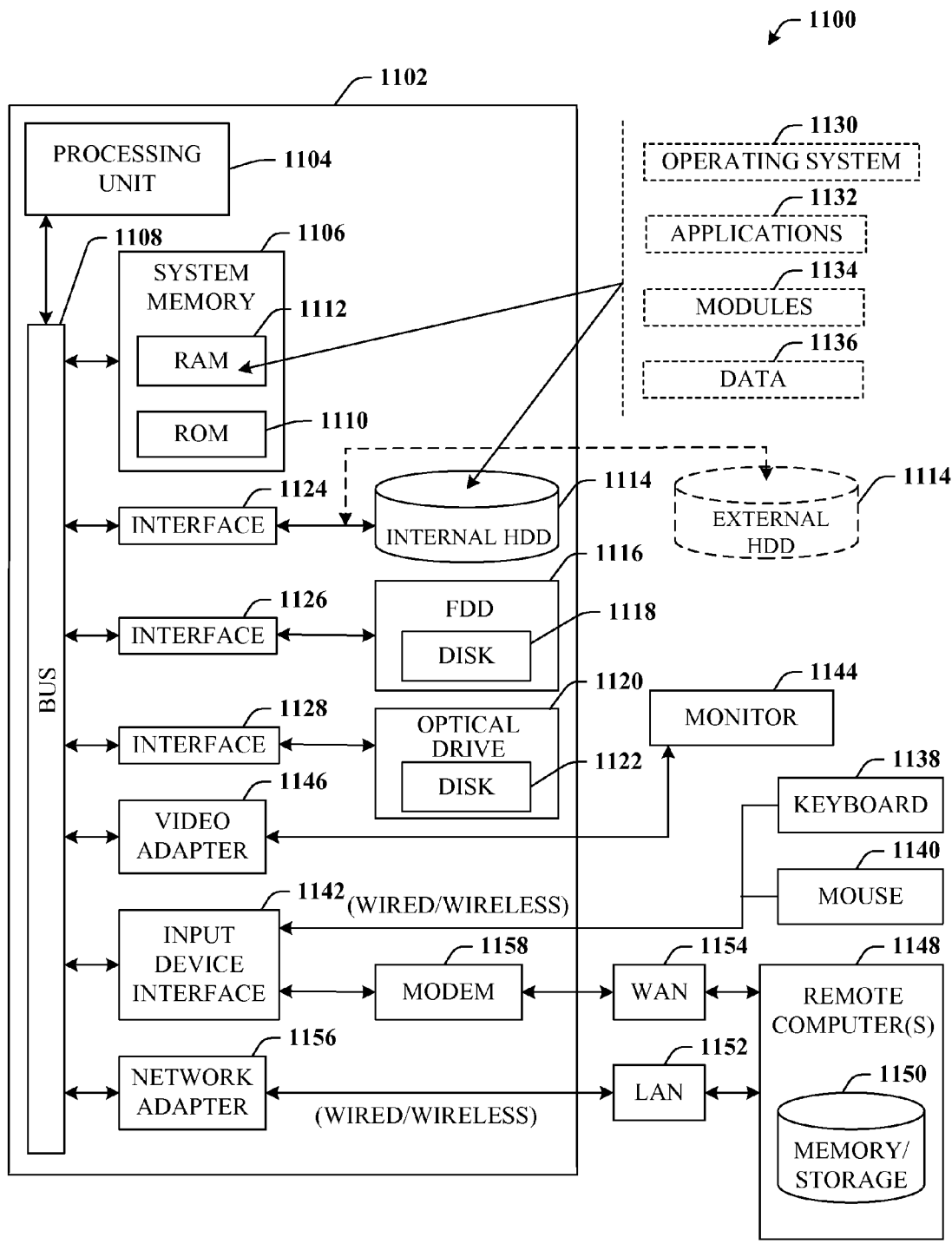
FIG. 11 is a block diagram of a computing system in which various aspects described herein can function.

In order to provide additional context for various aspects described herein, FIG. 11 and the following discussion are intended to provide a brief, general description of a suitable computing environment 1100 in which various aspects of the claimed subject matter can be implemented. While at least a portion of the above features can be implemented in the general context of computer-executable instructions that may run on one or more computers, those skilled in the art will recognize that said features can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, an exemplary environment 1100 for implementing various aspects described herein includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, a serial port, an IEEE-1394 port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at a 13 Mbps (802.11a) or 54 Mbps (802.11b) data rate, for example, or with products that contain both bands (dual band). Thus, networks using Wi-Fi wireless technology can provide real-world performance similar to a 10BaseT wired Ethernet network.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A charging unit to be used by an electronic device to charge an electronic device, the charging unit comprising:
    a first outer surface comprising a charging surface;
    a second outer surface and comprising a display surface, wherein the second outer surface is opposite the first outer surface such that when the charging surface is oriented upwards to receive an electronic device thereon for charging, the display surface is oriented downwards and is non-viewable;
    an initialization component configured to enable a load detection component based upon detecting that the charging surface is oriented upwards, the initialization component including an orientation tracking component configured to determine whether the charging device is oriented upwards such that the at least one charging surface thereon is engageable by the electronic device, wherein the load detection component is not enabled when the orientation tracking component determines that the charging device is not oriented upwards such that the at least one charging surface thereon is engageable by the electronic device, wherein the charging unit is not capable of detecting the electronic device when the load detection component is not enabled;
    the load detection component configured to detect engagement of the electronic device at the charging surface when enabled by the initialization component; and
    a charging component that is configured to wirelessly provide power to an engaged device at the charging surface via electromagnetic induction when the load detection component detects the engaged device;
    wherein the display surface is configured to display graphical information based on a determination by the orientation tracking component that the charging device is oriented to allow viewing of the display surface.

2. The charging unit of claim 1, wherein the initialization component further comprises a timer module configured to disable charging at the charging unit based upon determining that no device engagement has occurred at the charging device within a predetermined time period following enablement of charging.

3. The charging unit of claim 1, wherein the load detection component is configured to detect device engagement at least in part by determining whether a power receiver associated with the electronic device has been brought within inductive range of the charging surface.

4. The charging unit of claim 3, further comprising a resonating state monitor configured to determine a resonating frequency of the power receiver, wherein the charging component is configured to provide power to the associated electronic device via electromagnetic induction using the resonating frequency determined by the resonating state monitor.

5. The charging unit of claim 4, wherein the charging component comprises a switching circuit configured to facilitate periodic variance in an inductive current utilized for providing power to the associated electronic device via electromagnetic induction at the resonating frequency determined by the resonating state monitor.

6. The charging unit of claim 1, wherein the charging surface is configured to facilitate simultaneous charging of a plurality of disparate electronic devices.

7. The charging unit of claim 1, wherein the charging surface comprises a visible indicator configured to indicate that charging is occurring for one or more electronic devices.

8. The charging unit of claim 1, wherein the orientation tracking component is further configured to determine an orientation of a face of the at least one charging surface.

9. The charging unit of claim 8, wherein the orientation tracking component comprises at least one accelerometer.

10. The charging unit of claim 1, wherein the charging unit is configured to obtain information to display at the display surface.

11. A method, comprising:
activating a load detecting mode by monitoring orientation of an electronic charging pad and determining from the orientation that a charging area of the electronic charging pad is oriented upward to allow engagement of an electronic device with the charging area, the electronic charging pad comprising a display surface, wherein the display surface is opposite the charging area such that when the charging area is oriented upwards to engage the electronic device for charging, the display surface is oriented downwards and is non-viewable, the load detecting mode comprising a mode wherein the electronic charging pad is sensing for presence of an electronic device to be charged, wherein when the monitoring the orientation determines that the charging area is not oriented upward to allow engagement of the electronic device with the charging area the load detecting mode is not activated and the charging pad is not sensing for presence of the electronic device to be charged;
when the load detecting mode has been activated, detecting engagement between the charging area and at least one power receiver associated with at least one electronic device to be charged;
providing power to the at least one engaged power receiver via electromagnetic induction; and
displaying graphical information at the display surface when the monitoring the orientation determines that the electronic charging pad is oriented to allow viewing of the display surface.

12. The method of claim 11, wherein the detecting further comprises:
determining whether the power receiver is detected within a predetermined time following initialization of the load detecting mode; and
disabling the load detecting mode pending detection of a power receiver upon determining that a power receiver has not been detected within the predetermined time.

13. The method of claim 11, wherein the providing comprises:
determining a resonating frequency of an engaged power receiver; and
inductively providing power to the engaged power receiver at the determined resonating frequency.

14. The method of claim 11, further comprising disabling the load detection mode based upon detecting removal of an engaged power receiver from the charging area.

15. The method of claim 11, further comprising providing at least one visual or auditory indication that power is being provided to the at least one engaged power receiver.

16. The method of claim 11, wherein:
the detecting comprises detecting engagement between a plurality of power receivers associated with respective electronic devices and the charging area; and
the providing comprises providing power to the engaged power receivers simultaneously.

17. The method of claim 11, wherein the displaying comprises:
obtaining display information from an external information store; and
displaying the obtained display information at the display surface.

18. A charging pad for charging electronic devices, the charging pad comprising:
an inductive charging unit to charge devices placed on the charging pad, the charging pad having a first outer surface on which devices rest when being charged, the charging pad having a second outer surface comprising a display, wherein the second outer surface is opposite the first outer surface such that when the first outer surface is oriented upwards to receive an electronic device thereon for charging, the second outer surface is oriented downwards such that the display is non-viewable; and
an orientation sensor that senses the orientation of the charging pad, where the charging pad has an idle mode, a load detecting mode, and a charging mode, and where the charging pad is switched to and from the idle mode and the load detecting mode according to the orientation sensor determining that the charging pad is oriented such that the first outer surface is facing upward, and when an electronic device is placed on the charging pad while the charging pad is in the load detecting mode the charging pad enters the charging mode to charge the electronic device;
wherein the display is configured to display graphical information based on a determination by the orientation sensor that the charging pad is oriented to allow viewing of the display.

\* \* \* \* \*